INVENTOR:
MORRIS GOLDMAN

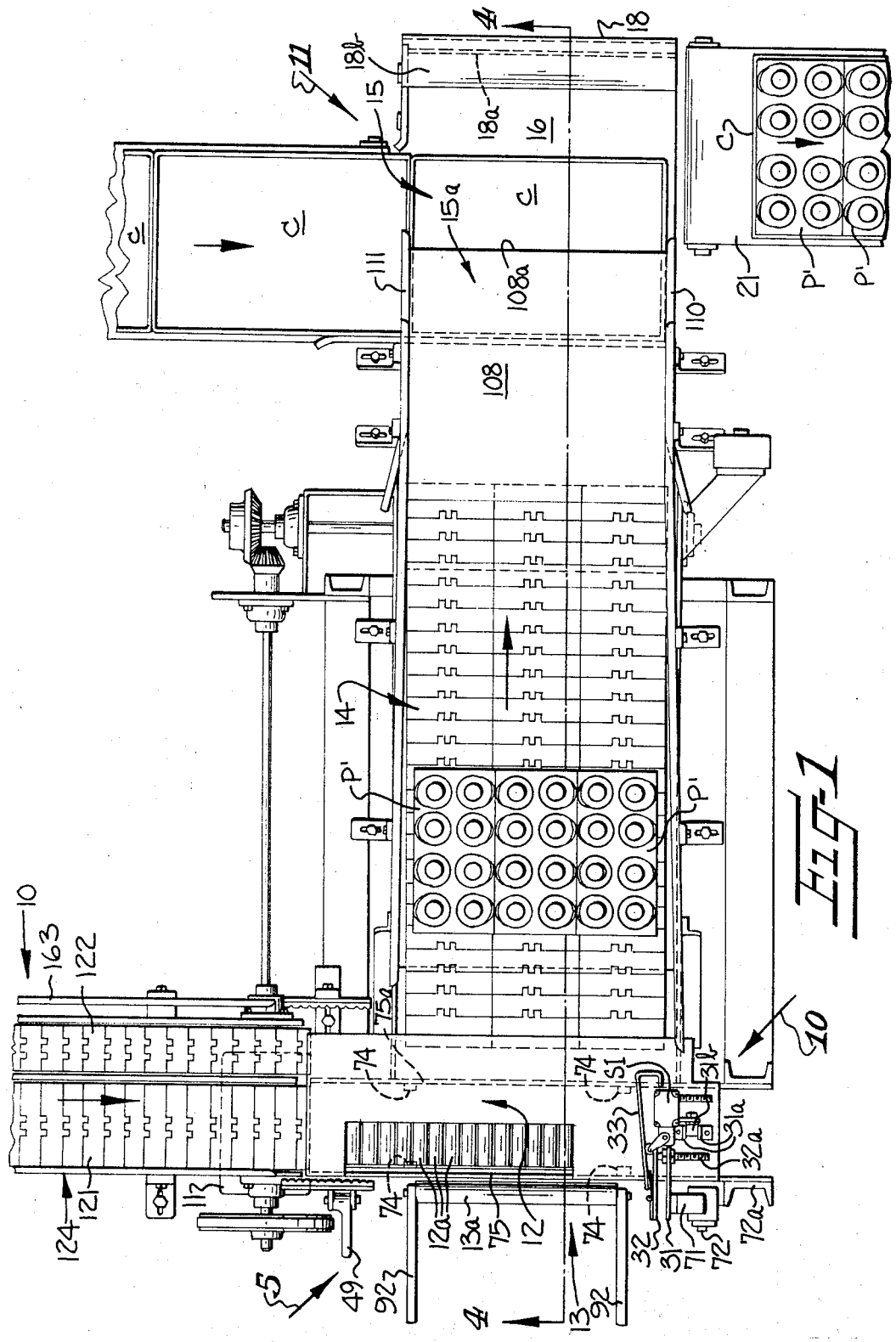

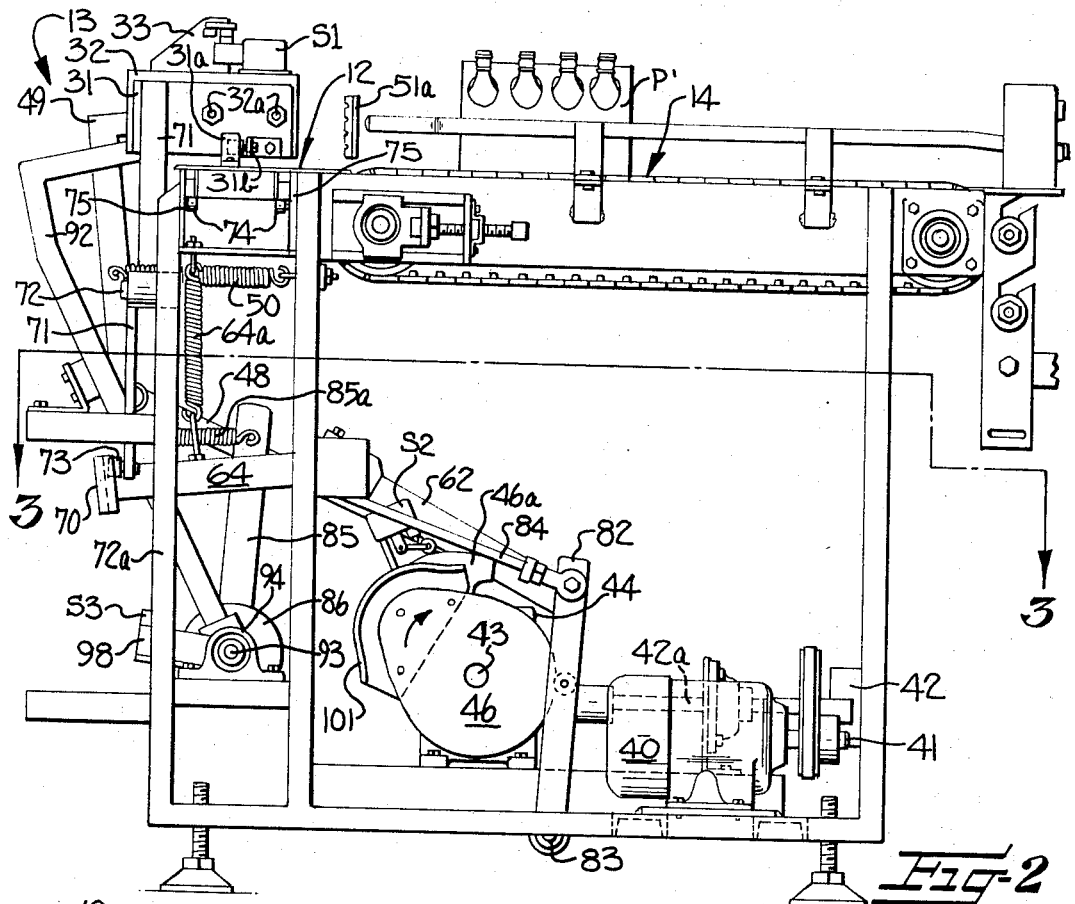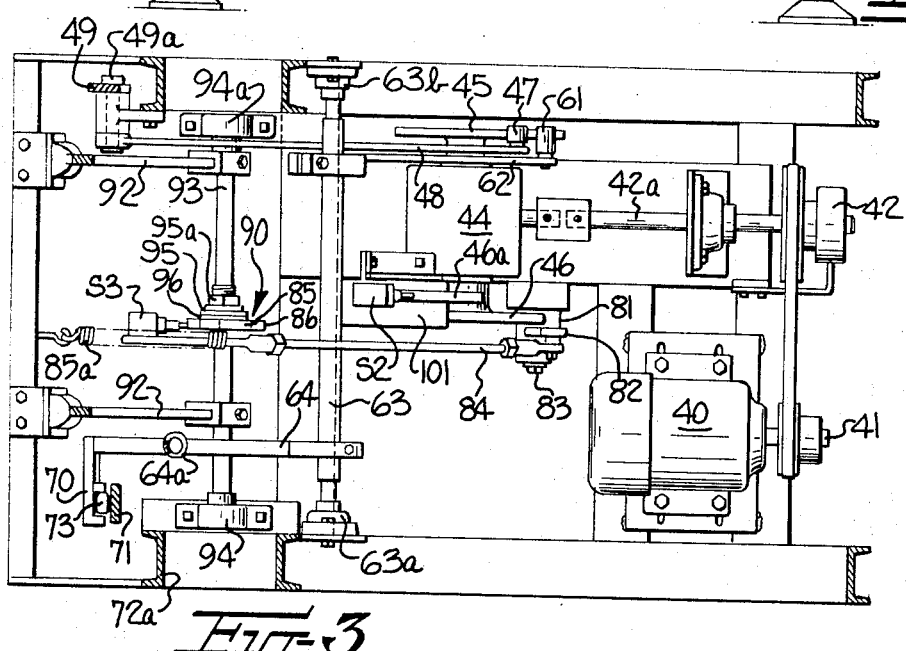

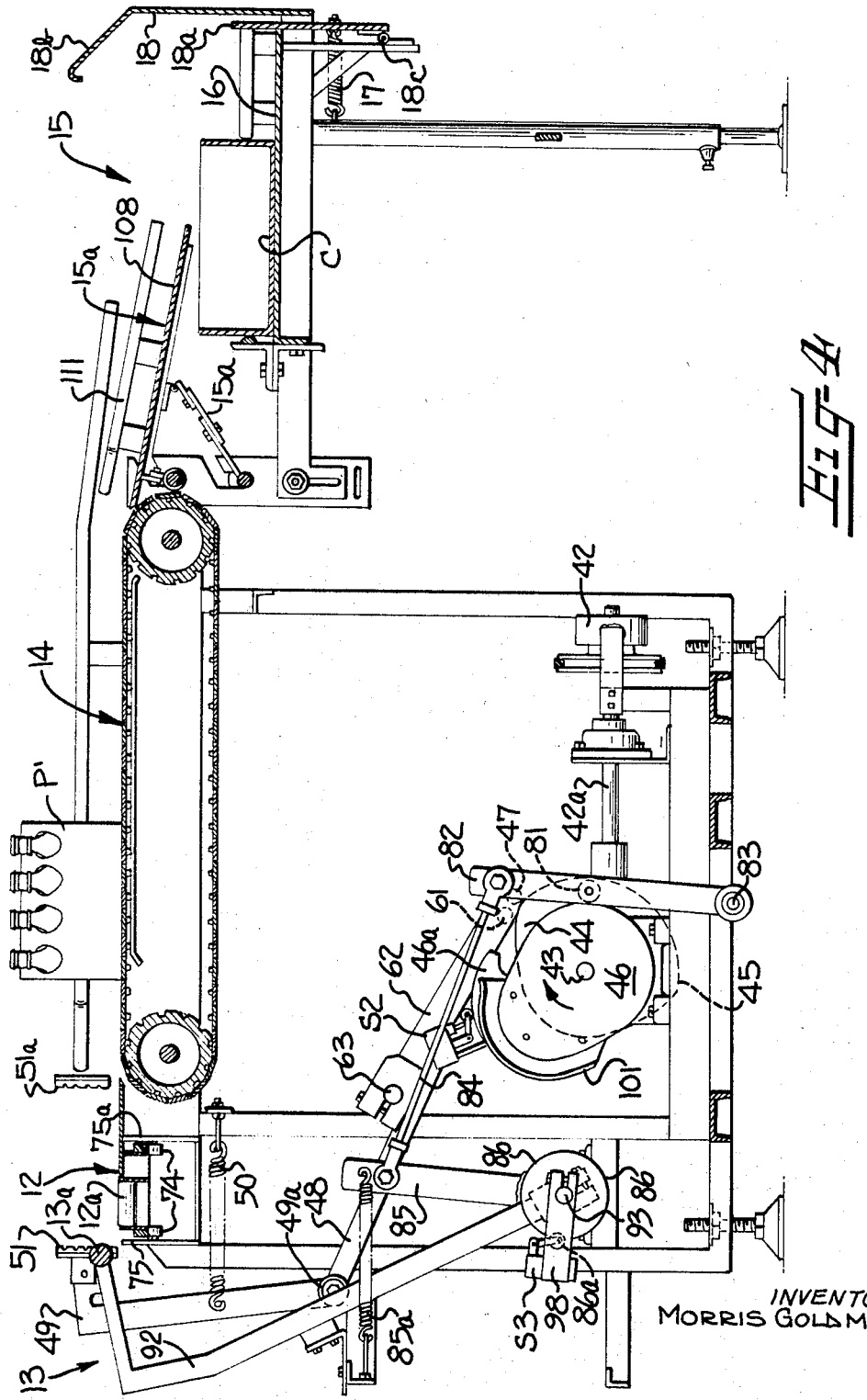

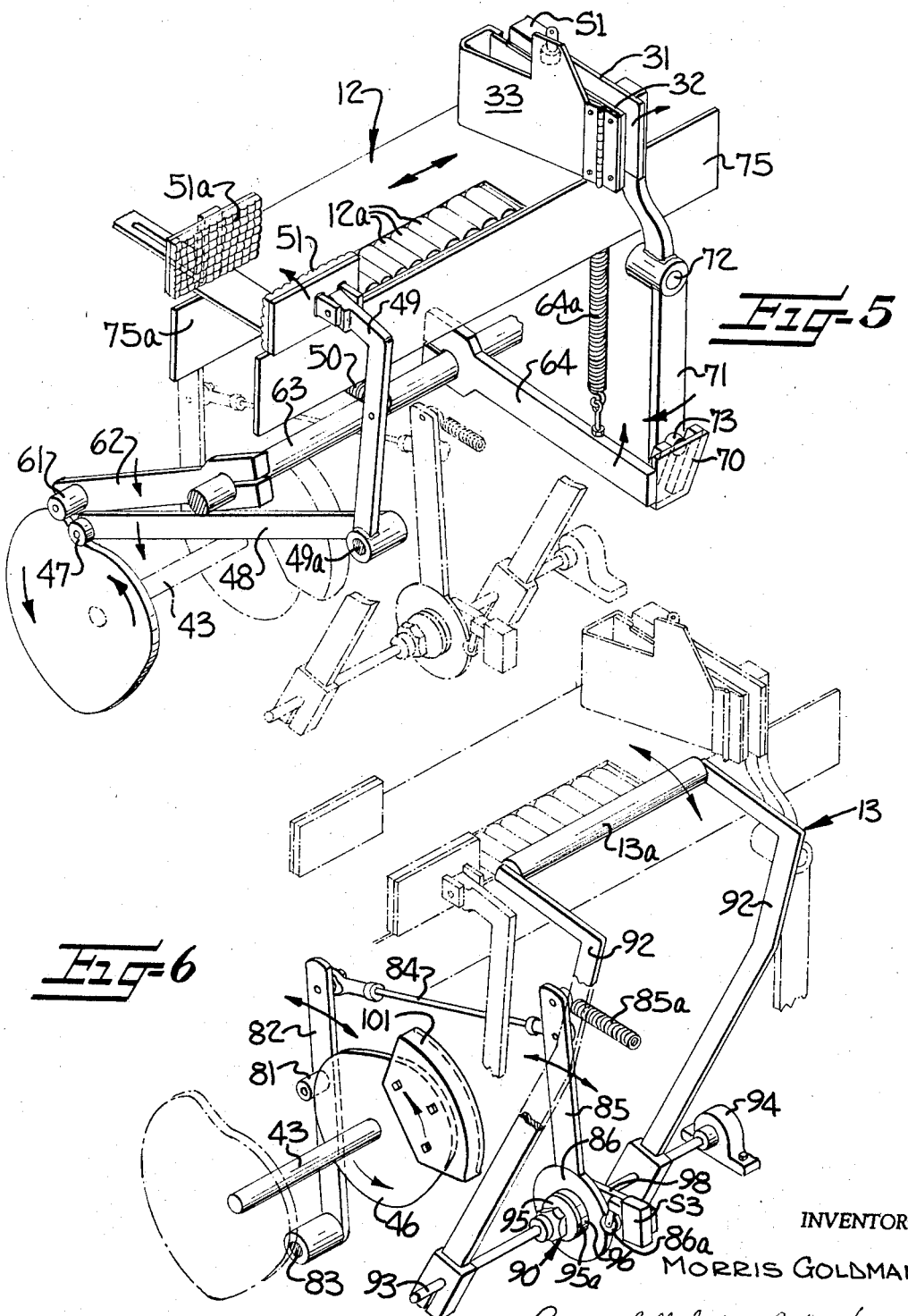

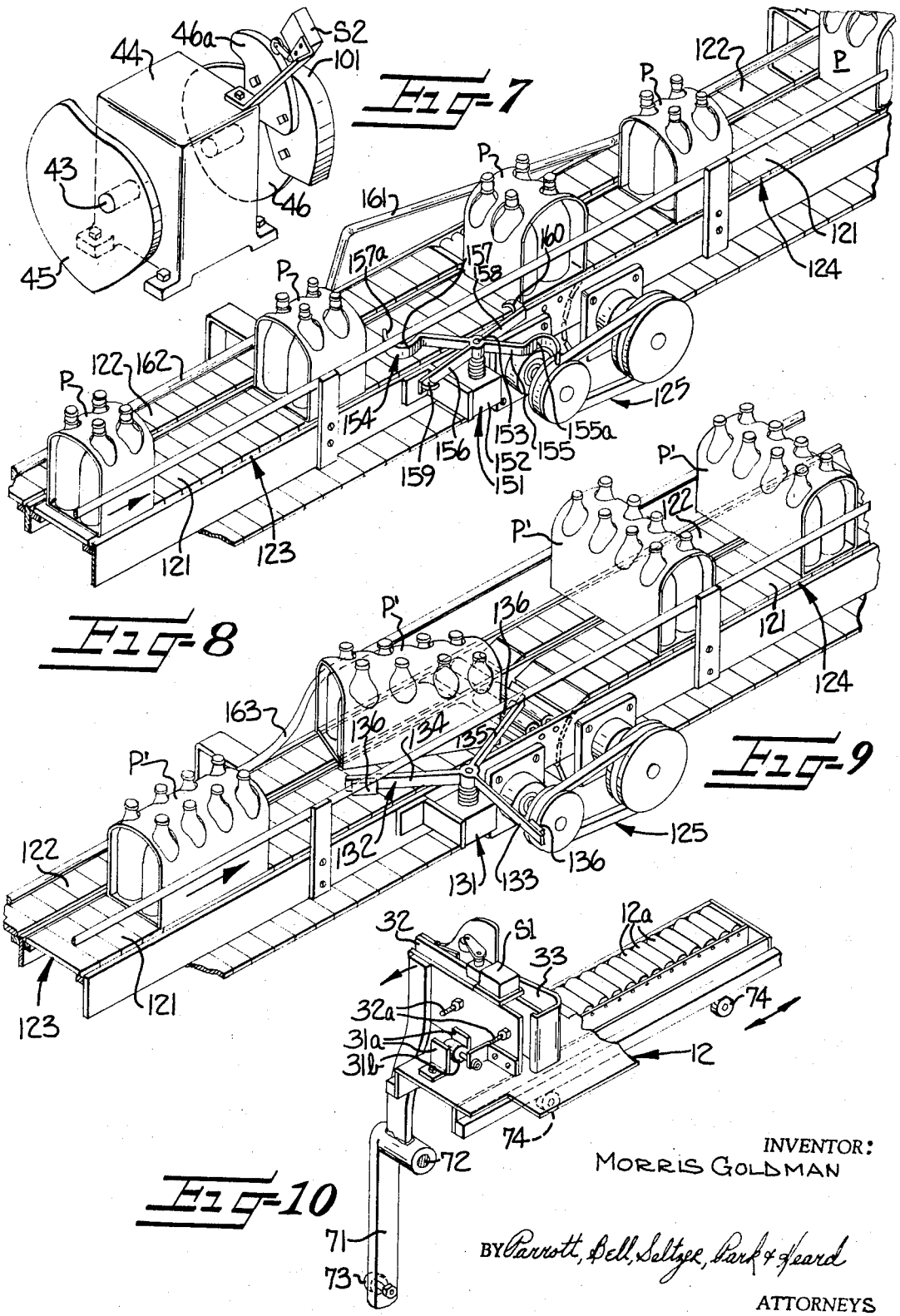

United States Patent Office 3,427,779
Patented Feb. 18, 1969

3,427,779
APPARATUS FOR PACKAGING ARTICLES
Morris Goldman, Philadelphia, Pa., assignor to Colonial Beverage Equipment, Philadelphia, Pa., a partnership composed of Morris Goldman and Philip A. Connelly
Continuation-in-part of application Ser. No. 546,021, Apr. 28, 1966. This application June 15, 1967, Ser. No. 646,382
U.S. Cl. 53—61      10 Claims
Int. Cl. B65b 57/10, 35/30; B65g 47/24

ABSTRACT OF THE DISCLOSURE

An apparatus for loading articles into receiving cases wherein the articles are conveyed in single file to an accumulating station where they are grouped in contiguous relation and isolated from subsequently fed articles, and thereafter fed in lines-abreast to and simultaneously inserted in receiving cases; and wherein "wrap-pack" cartons having a pair of open, opposing sides are selectively turned during their single file conveyance to avoid open-side contact of adjacent cartons during their accumulation and insertion into receiving cases.

---

This is a continuation-in-part application of my co-pending application Ser. No. 546,021, filed Apr. 28, 1966, now abandoned. This invention relates to a device for loading articles into receiving cases and more particularly to a loading machine in which a number of articles are simultaneously inserted into cases which closely confine the articles.

Automatic loading machines for transporting a plurality of articles to a close loading position and inserting the articles into receiving cases are known. Such machines generally have means for delivering a plurality of articles to an accumulating table where a predetermined number of articles are moved in a group therefrom and transported to a receiving station where groups are sequentially inserted into receiving cases.

In packaging articles of a fragile nature, machines of the type described often damage the articles during handling, particularly as they are removed or brushed off the accumulating table and as they are inserted as a group into the receiving cases. At such positions on the loading machines, articles such as cardboard, paper, or glass containers are often torn or broken open both by contact with the moving parts of the machine and by frictional engagement with each other during their relative movement.

Currently, open-sided cardboard cartons of the "wrap-pack" type are used to confine a plurality of smaller articles, such as glass bottles or cans, so that they may be easily carried by a purchaser. The size of these cartons depends on the number of articles enclosed therein. Currently, four, six and eight-bottle cartons are popular in the beverage field. In conventional packaging procedures, a plurality of such cartons are oriented, grouped, and loaded into larger receiving cases or crates made of corrugated paperboard, wood, plastic, metal or the like. In the beverage packaging field, such cases are of 24-bottle or can capacity and are rectangularly shaped to receive the bottles in a four by six-bottle rectangular configuration. When cardboard cartons are handled by present loading machines, they are often broken or torn due to rough handling by the machine and/or frictional contact between the cartons themselves. When such cartons are handled with their open sides contiguous, glass-to-glass contact of the bottles therein increases the chance of breakage. "Non-returnable" glass bottles are particularly susceptible to such breakage. Additionally, when plural "wrap-pack" cartons are simultaneously inserted into a receiving case to fill the case, their abrupt contact with the case often damages the contents of the cartons. It can thus be seen that, because of the fragile nature of modern packaging containers, automatic loading machines of the type described have not been satisfactory.

It is, therefore, an object of the present invention to provide a loading machine for simultaneously loading articles into receiving cases with a minimum of frictional contact during handling by the machine.

It is another object to provide a loading machine for automatically handling a plurality of articles, wherein selected ones of the articles may be rotatably reoriented and grouped for simultaneous loading into receiving cases.

It is also an object to provide a loading machine for effectively handling cartons of the "wrap-pack" type which contain glass items or bottles and have open sides and exposed areas of glass therein.

It is a further object of the invention to reduce breakage of glass items or bottles in open-sided cartons by turning selected ones of the cartons to prevent glass-to-glass contact during handling.

It is another object of the present invention to avoid damage of the articles due to their frictional engagement by isolating articles on the accumulating table, prior to their brush-off, from contact with articles being delivered thereto.

It is still another object of the present invention to minimize sharp or abrupt contact of the articles with a receiving case by providing means to dampen the force exerted on the articles during simultaneous insertion of a group of articles into the receiving case.

It is a further object of the invention to prevent damage to articles being brushed off the accumulating table when the articles are misaligned or disoriented from their normal brush-off positions.

Some of the objects of the invention having been stated, other objects will appear as the description proceeds when taken in connection with the accompanying drawings, in which—

FIGURE 1 is a fragmentary plan view of a loading machine including a delivery conveyor, accumulating table, discharge conveyor, and case loading station; and showing a plurality of eight-pack cartons during group delivery to and removal from the loading station;

FIGURE 2 is a fragmentary side elevation of a portion of the loading machine seen in FIGURE 1 showing the arrangement of the drive elements associated with the accumulating table for operating the brush-off device of the present invention;

FIGURE 3 is a sectional plan view of the portion of the loading machine shown in FIGURE 2 taken along line 3—3 thereof;

FIGURE 4 is a longitudinal cross-sectional view taken along line 4—4 of FIGURE 1;

FIGURE 5 is a fragmentary perspective view of the accumulating table looking in the direction of arrow 5 in FIGURE 1 and showing the control mechanisms for isolating articles on the table from adjacent articles on the delivery conveyor prior to brush-off;

FIGURE 6 is a fragmentary perspective view similar to FIGURE 5 of the accumulating table and showing the control mechanisms for operating the brush-off device;

FIGURE 7 is a perspective view of the control cams seen in FIGURES 5 and 6 and their support means;

FIGURE 8 is a fragmentary perspective view of the delivery conveyor of the loading machine including turning device for rotating alternate cartons transported thereby, and showing a plurality of four-bottle, square base cartons to illustrate the mode of operation of the turning device;

FIGURE 9 is a fragmentary perspective view of the delivery conveyor of the loading machine including a modified turning device for rotating every carton transported thereby, and showing a plurality of eight-bottle cartons to illustrate the mode of operation of the modified device;

FIGURE 10 is a fragmentary perspective view of a portion of the accumulating table, looking in the direction of arrow 10 in FIGURE 1;

Figure 11:
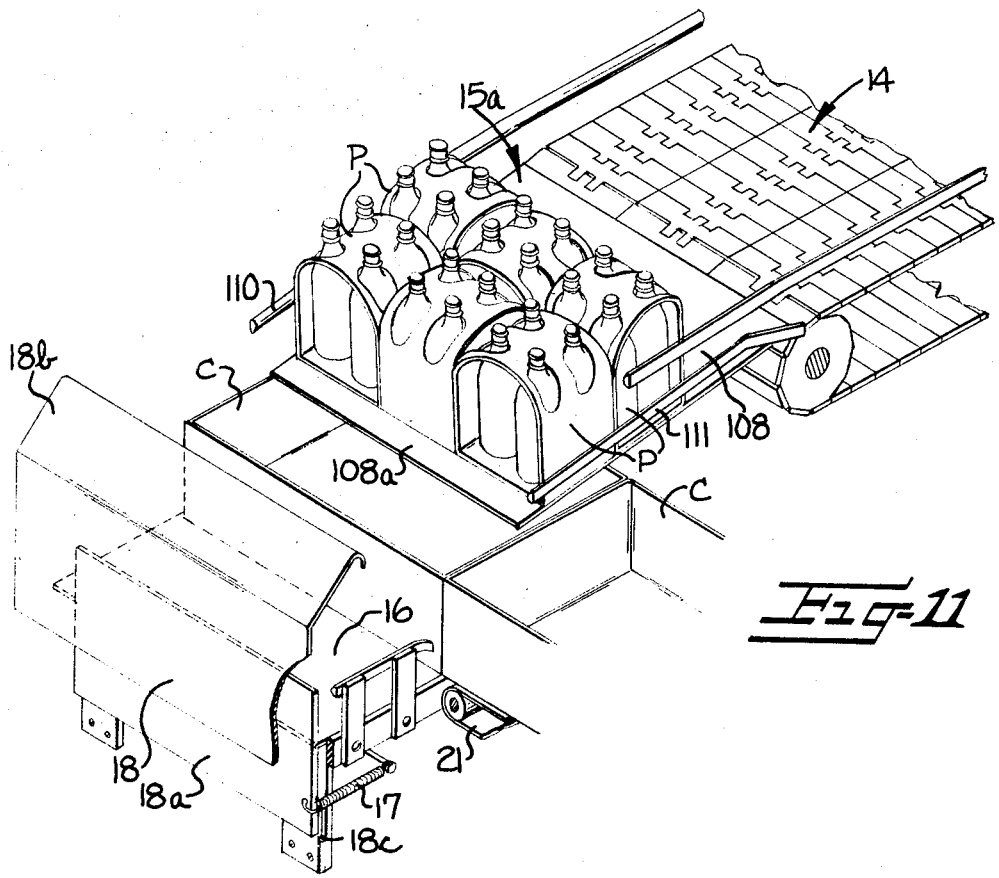
FIGURE 11 is a fragmentary perspective view of the case loading station, including the discharge chute, looking in the direction of arrow 11 in FIGURE 1.

Referring now to the drawings, and more specifically to FIGURE 1, a delivery conveyor mechanism 10, driven by a motor 11, transports articles, in single file, to an accumulating table 12. Each of the articles (not shown) deposited on table 12 is contacted by a subsequent oncoming article from conveyor 10 and pushed thereby over freely rotatable rollers 12a whereby a single file of contiguous articles are formed along the table 12. Upon accumulation of a predetermined number of articles on the table, a pusher mechanism 13 brushes off the articles from the table, in a line abreast, onto a discharge conveyor mechanism 14, also driven by motor 11. The articles are transported in line abreast to a case loading station 15, where the articles are so positioned that they may be readily manually inserted into a receiving case C. To better understand the operation of the loading machine of the present invention, a plurality of "wrap-pack" bottle cartons, P (FIGURES 8 and 11) and P' (FIGURES 1, 2 and 9), of four and eight-bottle size, respectively, are illustrated in the drawings and will be referred to in the following description of the loading machine. It is, of course, to be understood that other articles of varying type and size may be handled by the machine without departing from the scope of the invention.

Loading station 15 is best seen in FIGURE 11 and includes a discharge chute 15a onto which the articles are delivered by the discharge conveyor 14. The receiving case C is supported beneath the discharge end thereof by a table 16 and so positioned that an operator standing in front of table 16 and facing the end of the discharge chute may manually draw one or more lines abreast simultaneously into the case C. As the articles are drawn into the case, the forward line of articles contacts the far side of the case and slides the case C across the table 16 and away from under the end of the discharge chute. A substantially vertical end plate 18 limits the sliding movement of case C and a buffer plate 18a is located in front of stop plate 18 and is biased inwardly therefrom by springs 17 to prevent sudden and sharp contact of the case with plate 18. After case C is filled, it is moved from table 16 on a case conveyor 21.

*The accumulating mechanism*

As seen in FIGURE 1, a vertical plate 31 is disposed at one end of table 12 and has a horizontally adjustable intermediate plate 32 attached thereto by bolts 32a which can be rotated to position plate 32 along the length of the accumulating table 12 to vary the number and compensate for varying size of articles being accumulated. Attached to the plate 32 for pivotal movement about its point of attachment is a vertical hinged plate 33 which is biased toward the discharge end of the delivery conveyor by suitable means (not shown) and which is adapted to be engaged and pivotally moved by the endmost article on the table 12.

Located behind hinged plate 33 on plate 32 is a switch $S_1$ which has a switch actuating roller in contact with the back of plate 33 to open and close switch $S_1$ when the plate 33 is pivotally moved. When sufficient articles accumulate in contiguous relation on table 12, an oncoming article from delivery conveyor 10 will move the accumulated articles against plate 33 to close switch $S_1$ and thereby initiate a series of movements, which will be explained.

Suitably located beneath the accumulating table 12 is a continuously driven motor 40 (FIGURES 2 and 3) which has a drive shaft 41 suitably connected to a conventional electric clutch mechanism 42 the operation of which is controlled by switch $S_1$, as will be explained. The clutch mechanism 42 is in turn operatively connected by a rotatable shaft 42a and gear reduction unit 44 to a cam shaft 43 to rotate a pair of eccentric cams 45, 46 which program the sequential operation of the accumulating mechanism.

Cam 45 operates an article restraining means for restraining movement of articles onto the accumulating table 12 during selected periods. As illustrated, this restraining means includes a cam follower 47 which rides on cam 45 and is attached to one end of a follower arm 48 (FIGURE 5). An upstanding arm 49 is fixed to the other end of arm 48 and extends at an angle therefrom to a point adjacent the delivery conveyor 10. Arms 48 and 49 are supported for pivotal movement about a horizontal shaft 49a and are biased by a spring 50 to maintain cam follower 47 in contact with cam 45. Arm 49 actuates a pair of relatively movable gripper plates 51, 51a, of which plate 51a is illustrated as being adjustably fixed on one side of the delivery end of conveyor and plate 51 is pivotally mounted on the upper end of arm 49 for movement toward and away from plate 51a.

To separate accumulated articles on the table from the gripped article being restrained on the delivery conveyor 10, the accumulating table 12 is provided with means to horizontally move the table and the articles thereon away from the delivery end of conveyor 10. For this purpose, a second cam follower 61 rides on cam 45 and is attached to a cam follower arm 62 which is fixed to a horizontal shaft 63 for pivotal movement therewith. Shaft 63 extends beneath the table 12 and is supported in journal bearings 63a, 63b (FIGURE 3). Fixed on the shaft 63 below the end plate 31 is a radially extending lever arm 64 having an upstanding angular slotted block 70 attached to its outer end. Lever arm 64 is biased in an upward direction by a spring 64a to maintain cam follower 61 in contact with the peripheral surface of cam 45. A vertically extending rocker arm 71 is pivotally supported on a shaft 72 attached to an upstanding frame member 72a (FIGURE 2). The upper end of arm 71 is fixed to and supports plate 31 and the lower end of arm 71 has a substantially horizontally extending cam follower 73 which is disposed in the angular slot of block 70. As best seen in FIGURE 9, table 12 is supported for the aforementioned horizontal linear movement on four rollers 74, only two of which are shown, which are in turn mounted on side plates 75, 75a (FIGURE 5) attached to the loading machine support frame. Plate 31 is operatively connected to the table 12 by brackets 31a mounted on the table and a roller element 31b carried by the plate and positioned therebetween. Thus, pivotal movement of lever arm 64 causes rocker arm 71 and plate 31 to pivot about support shaft 72 to move table 12 in a horizontal direction.

In operation, when a sufficient number of articles accumulate on table 12 to displace hinged end plate 33 and close switch $S_1$, the clutch mechanism 42 is engaged to connect the continuously rotating motor drive shaft 42 to the cam shaft 43 and thus rotate cams 45 and 46. As cam follower 47 moves over the major lobe of cam 45, gripper plate 51 moves toward fixed gripper plate 51a to grip the leading article on the delivery conveyor and prevent its movement onto table 12. Immediately thereafter, the major lobe of cam 45 displaces cam follower 61 and the accumulating table 12 moves horizontally away from the end of the delivery conveyor 10. Movement of the table carries the rearmost article on the accumulating table away from the gripped article and prevents frictional contact of the articles during brush-off by the pusher mechanism 13.

The pusher mechanism

The operating elements of the pusher mechanism 13 are best shown in FIGURE 6 and are operated through a full sequence by cam 46 upon each revolution thereof. In this respect, an auxiliary cam 46a (FIGURE 4) is carried by one side of the cam 46 adjacent its major lobe and contacts a switch actuating roller element of a switch $S_2$. Switch $S_2$ is electrically connected to the clutch mechanism 42 to disengage the same on each revolution of cam 46.

A cam follower 81 is carried by an upstanding follower arm 82 which is pivotally supported at its lower end on a shaft 83 journalled to the support frame of the loading machine, in a manner not shown. A tie rod 84 connects the upper end of the follower arm 82 to the upper end of an upstanding lever arm 85. A spring 85a, connected to the frame of the machine, biases the arm 85 to maintain the cam follower 81 in contact with the cam 46. The lower end of upstanding arm 85 is attached to a vertically disposed, generally circular plate 86 which is pivotally supported on and at a fixed linear position along a horizontally disposed shaft 93 supported by end bearings 94 and 94a shown in FIGURE 3.

A torque limiter mechanism, generally indicated at 90, comprises a pair of vertical clutch plates 95 and 96 supported through their centers on shaft 93 with their inner faces in frictional engagement. Clutch plate 96 is fixed to circular plate 86 and is free to pivot therewith about shaft 93. Clutch plate 95 is fixed to the shaft 93 by means of an adjustable locking device 95a which also maintains the inner face of the plate 95 in variable frictional engagement with the opposing face of clutch plate 96. A switch $S_3$, angularly fixed on shaft 93 by means of bracket 98, has a switch actuating roller element which rests in a groove 86a on the peripheral surface of circular plate 86.

A pusher bar 13a is disposed horizontally above table 12 and is supported by a pair of pusher bar arms 92 which are fixed at their lower ends for pivotal movement with shaft 93.

In operation, the major lobes of cam 46 and cam follower 81 are positioned with respect to cam 45 and its followers 47 and 61 so that after movement of gripper plate 51 and table 12, the pusher arm 13 is moved to discharge the accumulated articles from table 12.

Figure 12:
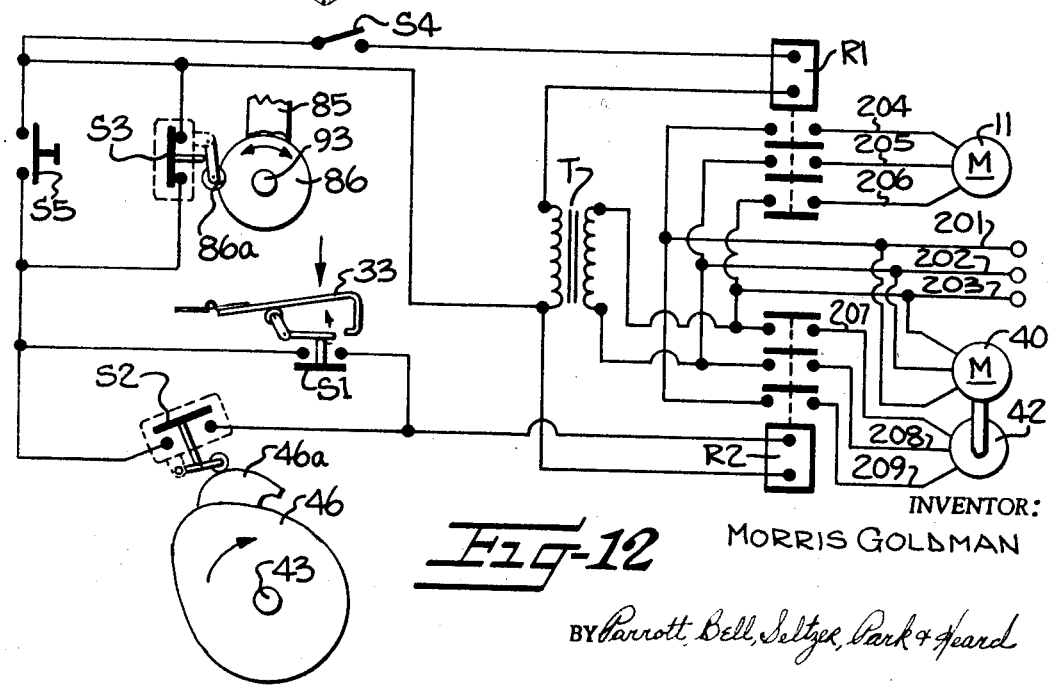
FIGURE 12 is a wiring diagram of the electric control circuits of the loading machine.

As a safety feature, in the event that articles cannot be pushed freely from the accumulating table 12 by pusher bar 13a due to some obstruction thereof or the like, an increase in resistance to the movement of the pusher bar 13a across the table is transmitted by the bar arms 92 and shaft 93 to the torque limiter 90 and causes clutch plates 95 and 96 to slip, pivotally displacing shaft 93 with respect to arm 85. Displacement of shaft 93 also causes the switch actuating roller element to be displaced from the groove 86a to open switch $S_3$, disengage clutch mechanism 42, and stop movement of pusher bar 13a. The exact sequence of operation of the associated elements and their electrical circuits will be explained by reference to the wiring diagram in FIGURE 12.

To reposition the pusher bar 13a for movement across table 12, the major lobe of cam 46 is provided with a cam cap 101 which overlies the peripheral surface of the major lobe of the cam. When the pusher bar 13a stops during movement across the table 12, cam follower 81 is on the major lobe of cam 46 and under cam cap 101. After articles have been cleared from the accumulating table and pusher bar 13a is free to move, an override circuit is manually energized to engage clutch mechanism 42 and rotate cam 46. The inner surface of cam cap 101 engages the cam follower 81 to maintain it in contact with the peripheral surface of cam 46 and, by means of the linking elements therebetween, the clutch plates 95, 96, lever arm 84, and rocker arm 92 are angularly repositioned. The roller element of switch $S_3$ reseats itself in the groove 86a on the peripheral surface of plate 86 and the switch $S_3$ returns to its normally closed position.

The discharge chute

After articles are brushed off the accumulating table 12 in a line abreast, the discharge conveyor 14 delivers the articles to the discharge chute 15 (FIGURE 11) which includes a generally horizontal flat plate 108. The outer end 108a of the plate tilts downwardly and is disposed above a receiving case C. A pair of substantially parallel side rails 110, 111 are located above and extend along the side edges of the plate. In operation of the discharge chute, the side rails 110 and 111 are adjustably spaced substantially the same distance apart as the length of the line abreast of cartons on plate 108 to assist in guiding the same into the case C.

As seen in FIGURE 11, an operator, standing at the end of discharge chute 15 and facing the end of the chute may manually draw two rows of cartons out of the discharge chute 15 and into receiving case C. This movement of the cartons contacts the outer wall of case C to move the case toward end plate 18 and the two rows of cartons drop into the case. To avoid abrupt contact of the sliding case 16 with end plate 18, the substantially vertical buffer plate 18a is positioned inside plate 18 and engages the outer wall of the receiving case during its lateral sliding movement. The buffer plate 18a is hinged to table 16 at 18c and is biased by a pair of springs 17 in the direction of the discharge chute so that it prevents sharp contact of a loaded receiving case with the end plate 18 and reduces damage to articles therein. The cases are then moved away from the discharge chute on the case discharge conveyor 21.

As a safety feature for the operator, the end plate 18 of support table 16, which limits the lateral movement of the receiving cases during loading, has a flanged upper portion 18b which shields the face and body of the operator from the articles during insertion. Flanged portion 18b may also serve to support the torso of the operator as he leans over the table 16 to manually draw the articles from the discharge conveyor 21 and thereby prevent unnecessary back-strain to the operator during loading of the cases.

The turning device

When "wrap-pack" cartons having a pair of opposing, open sides are to be loaded into receiving cases (FIGURES 8 and 9), it is desirable to properly orient the cartons for insertion into a case (FIGURES 1 and 11) and also to avoid contact of the open sides of adjacent cartons during their grouping on and removal from the accumulating table. Contact of the open sides of the cartons can be prevented and such cartons properly oriented by utilizing the turning device of the present invention.

As seen in FIGURE 8, the delivery conveyor 10 includes a pair of generally parallel belts 121, 122 which are suitably connected to and linearly moved by the conveyor motor 11. By providing parallel belts, the delivery conveyor 10 is quickly adapted to accommodate articles of various widths without extensive modification of the loading machine or loss of operating time, and also to accommodate elongate articles thereon after they are re-oriented, as will be seen hereinafter.

Each of the belts 121, 122 is transversely divided into first and second endless sections 123, 124 which are interconnected by a pair of pulleys and belt arrangement 125 so that the first, or leading sections 123 of each belt are uniformly driven at a greater linear speed than their second, following sections 124, for a purpose which will be explained. A plurality of substantially square-based, four-bottle cartons P are transported in single file on the leading portion 123 of the moving belt 121 and are aligned initially with the open sides of adjacent cartons juxtaposed.

Located adjacent the end of the leading portion 123 of the belt 121 is a turning device, generally indicated at 151, for pivoting alternate ones of the open-sided cartons, during their movement on the delivery conveyor, so that alternate cartons on the conveyor have their open sides perpendicular to each other. Turning device 151 comprises a support base 152 which is removably mounted on the support frame of the conveyor 10 adjacent the surface of the moving belt 121. The base 152 supports a freely rotatable upstanding shaft 153 upon which is mounted a rotor member 154 having a plurality of horizontally disposed, radially-extending arms 155–158. The radial arms 155–158 are positioned so that each sequentially lies in the path of the moving articles on belt 121 during rotation of the member 154. Alternate opposed arms 156, 158 have hooks 159, 160 extending at substantially right angles from their outer ends while alternate opposed arms 155 and 157 have curved outer portions 155a, 157a which serve as carton engaging surfaces. Each carton P passing the turning device 151 sequentially engages an arm and pushes it out of the path of the belt, which causes a following arm on the turning device to move into the path of the belt in front of a following carton thereon. As the curved portions of arms 155 and 157 alternately engage alternate cartons on the belt, the cartons slide over the curved portion of the arm and move undisturbed in their position on the belt. As the hooked arms 156 and 158 alternately engage alternate following cartons on the conveyor, hooks 159 and 160 engage a leading corner of a contacted carton to restrain movement of the carton about the corner during its travel past the turning device 151 causing the carton to pivot about the restrained corner and turn approximately 90°.

To permit free movement of the cartons about their restrained corners, a portion 161 of side rail 162 opposite the turning device is angled outwardly. Thus it can be seen that alternate cartons P passing the device are pivoted approximately 90° to position their open sides at right angles to the open sides of adjacent cartons and bottle-to-bottle contact is prevented. The provision of a greater linear speed for the leading portion 123 of belt 121 not only facilitates turning of the cartons, but also closely spaces them on the following slower moving portion 124 of the belt for subsequent grouping on the accumulating table.

FIGURE 9 shows a modified turning device of the present invention which is used to properly orient the larger, rectangular, open-sided eight-bottle cartons P' for subsequent loading into cases. When loading the eight-bottle cartons, it is necessary to rotate every carton passing the turning device so that they are properly oriented on the discharge conveyor (FIGURE 1) for insertion into the four by six-bottle configured cases. To accomplish this, the turning device 151 shown in FIGURE 8 is removed from the support frame of the delivery conveyor and a turning device 131 having a three-arm rotor member 132 is substituted therefor. The three-arm rotor member operates in substantially the same manner as described in respect to the four-arm rotor member 154 of FIGURE 8, with the exception that the outer end of each of the arms 133–135 is provided with a hook element 136, and during rotation of the rotor member 132 by the moving cartons P', the elements 136 sequentially contact leading corners of the cartons to rotate them 90°.

To accommodate the greater transverse width of the cartons P' on the conveyor 10 after reorinetation, the parallel belt 122 is utilized. To accomplish this, the side rail 162 (FIGURE 8) is removed and a similarly configured side rail 163 is positioned along the outer edge of the belt 122. By providing a greater belt speed for the leading or incoming portion 123 of the conveyor, the eight-bottle cartons P' are more easily turned by the rotor member 132 and the subsequent spacing between the reoriented cartons is kept to a minimum by moving them away from the turning device 131 at a slower speed than they are fed thereto.

When it is desired to load six bottle wrap-pack cartons on the present loading machine, this may be easily accomplished by complete removal of the turning device and undisturbed passage of the six-bottle cartons onto the accumulating table where they are grouped in two-carton lines abreast and transported to the loading station for insertion into the receiving cases.

The electrical conrtol system

The sequential operation of the moving elements associated with the accumulating table 12, gripper plates 51, 51a, and pusher bar 13a are controlled by a series of electric circuits which are seen in FIGURE 11. The wiring diagram includes a showing of the relationship of the switches to the elements of the loading machine which actuate them.

Conductors 201, 202, and 203 which lead from a suitable power supply are connected to the contact sets of relays $R_1$ and $R_2$ and to motor 40, which runs continuously during operation of the loading machine. The contact sets of $R_1$ and $R_2$ are, in turn, electrically connected by lines 204–209 to the conveyor motor 11 and electric clutch mechanism 42, respectively, to energize and de-energize the same. Conductors 202 and 203 are also connected to the primary winding of a transformer T which supplies current to operate the relays.

A first control circuit connects the secondary winding of transformer T in series with relay $R_1$ and a master switch $S_4$. A second control circuit connects the secondary winding of the transformer in series with relay $R_1$, master switch $S_4$, parallel switches $S_3$ and $S_5$, parallel switches $S_1$ and $S_2$, and relay $R_2$ of the clutch mechanism 42. As seen, the switch actuating roller element of normally closed switch $S_3$ rests in the groove 86a of circular plate 86 and the switch actuating roller of normally open switch $S_1$ engages the back face of the hinged plate 33.

In operation, master switch $S_4$ is closed to start the conveyor motor 11 and move articles along the delivery conveyor onto the accumulating table. When sufficient articles have accumulated on the table 12 to close switch $S_1$ and engage clutch mechanism 42, the gripper plates are moved to restrain articles on the delivery conveyor and pusher bar 13a moves to displace the articles from the table. When cam 46 completes one revolution, the secondary cam 46a opens the switch $S_2$ to disengage the clutch mechanism 42 and articles again accumulate on the table 12.

When excess pressure on pusher bar 13a displaces the friction plates of the torque limiter and opens normally closed switch $S_3$ to disengage clutch mechanism 42, manually operated override or jog switch $S_5$ is closed to re-engage the clutch 42 until cam 46 has completed its one revolution cycle. Cam cap 101 maintains cam follower 81 in contact with cam 46 to return the pusher bar linkages and the elements of switch $S_3$ to their relative operating positions.

In the drawings and specification, there have been set forth preferred embodiments of the invention, and although specific terms are employed, they are used in a generic and descriptive sense only and not for purposes of limitation, the scope of the invention being defined in the claims.

I claim:
1. A loading machine for simultaneous loading of a number of substantially rectangular cartons having a pair of opposed open sides into a case confining the cartons, said machine comprising
   a support frame,
   a carton accumulating table supported for movement thereon,
   a delivery conveyor extending from said table for initially conveying cartons thereon with the open sides facing in the same direction and for introducing cartons in single file onto said table, turning means positioned adjacent to and cooperating with said delivery conveyor for turning selected ones of said cartons on said delivery conveyor substantially 90° about their bases, said delivery conveyor including a moving belt for transporting articles thereon and having a first portion located prior to said turning means and moving at a relatively high speed and a second portion extending between said turning means and said accumulating table and moving at a relatively slower speed, whereby the relatively high speed of movement of cartons approaching said turning means facilitates turning the cartons on said belt and the slower speed of movement of cartons leaving said turning means maintains their spacing on said belt at a minimum after turning, a discharge conveyor extending from said table at a substantially right angle to said delivery conveyor, a pusher movable across said table to engage cartons thereon and position them onto said discharge conveyor in a line abreast, a discharge chute located at the outer end of the discharge conveyor adapted to direct said line abreast cartons simultaneously into a receiving case positioned below an outer end of said discharge chute, means associated with said table for accumulating a predetermined number of cartons on said table from said delivery conveyor in a single file with adjacent cartons of said number contiguous and for moving said table containing said cartons in the same direction as said cartons are introduced onto said table while restraining movement of cartons from said delivery conveyor, whereby cartons on said table are moved out of contact with cartons on said delivery conveyor, and means for actuating said pusher subsequent to said table movement to displace the cartons from said table onto said discharge conveyor.

2. A loading machine for simultaneous loading of a number of substantially rectangular cartons having a pair of opposed open sides into a case closely confining the articles, said machine comprising a support frame, a carton accumulating table supported for movement thereon, a delivery conveyor extending from said table for introducing cartons in single file onto said table, said delivery conveyor including juxtaposed parallel moving belts for supporting cartons of various widths for movement thereon and for accommodating elongate cartons, turning means positioned adjacent to and cooperating with said delivery conveyor for turning selected ones of said cartons on said delivery conveyor substantially 90° about their bases, a discharge conveyor extending from said table at a substantially right-angle to said delivery conveyor, a pusher movable across said table to engage cartons thereon and position them onto said discharge conveyor in a line abreast, a discharge chute located at the outer end of the discharge conveyor adapted to direct said line of abreast cartons simultaneously into a receiving case positioned below an outer end of said discharge chute, means associated with said table for accumulating a predetermined number of cartons on said table from said delivery conveyor in a single file with adjacent cartons of said number contiguous and for moving said table containing said number of cartons in the same direction as said cartons are introduced onto said table while restraining movement of cartons from said delivery conveyor, whereby cartons on said table are moved out of contact with cartons on said delivery conveyor, and means for actuating said pusher subsequent to said table movement to displace the cartons from said table onto the said discharge conveyor.

3. A loading machine for simultaneous loading of a number of substantially rectangular articles into a case closely confining the articles, said machine comprising a support frame, an article accumulating table supported for movement thereon, a delivery conveyor extending from said table for introducing articles in single file onto said table, rotatable turning means positioned adjacent to said delivery conveyor and normally extending into the path of selected ones of the articles on said delivery conveyor for engaging one of the leading corners of the selected articles and cooperating with the delivery conveyor for turning the selected articles substantially 90° about their bases, said turning means being positioned for engagement with the selected articles by the immediately preceding articles on said delivery conveyor, a discharge conveyor extending from said table at a substantially right angle to said delivery conveyor, a pusher movable across said table to engage articles thereon and position them onto said discharge conveyor in a line abreast, a discharge chute located at the outer end of the discharge conveyor adapted to direct said line of abreast articles simultaneously into a receiving case positioned below an outer end of said discharge chute, means associated with said table for accumulating a predetermined number of the articles on said table from said delivery conveyor in a single file with adjacent articles of said number contiguous and for moving said table containing said number of articles in the same direction as said articles are introduced onto said table while restraining movement of articles from said delivery conveyor, whereby articles on said table are moved out of contact with articles on said delivery conveyor, and means for actuating said pusher subsequent to said table movement to displace the articles from said table onto said discharge conveyor.

4. A loading machine as defined in claim 3 in which said turning means comprises a substantially vertical shaft rotatably mounted on said support frame adjacent said delivery conveyor, a rotor member supported on said shaft and including a plurality of horizontally-disposed, radially-extending arms rotatable into and out of the path of said cartons along said delivery conveyor, said arms being spaced at substantially equal angles about said shaft, and selected ones of said arms having means on the outer ends thereof for sequentially restraining corner portions of said selected ones of articles to turn said articles about their restrained corner portions substantially 90° during their movements past said turning means.

5. A loading machine as defined in claim 4 wherein said rotor member has an even number of said arms and at least four thereof, and wherein said means for sequentially restraining corner portions of the cartons are located only on alternate arms to turn each alternate article during its movement past said turning means.

6. A loading machine as defined in claim 4 wherein said means for restraining corner portions of the cartons are located on all of said arms of said rotor to turn all articles during their movement past said turning means.

7. A loading machine as defined in claim 3 wherein said means for actuating said pusher includes safety means to stop movement of said pusher in response to a predetermined pressure opposing said pusher and displacing said predetermined number of articles from said table, said safety means including a friction clutch having a pair of opposed friction plates in contiguous relation, the relative position of said plates being displaced upon influence of said predetermined pressure on said pusher.

8. A loading machine as defined in claim 3 in which said means for accumulating a predetermined number of said articles includes a vertically disposed plate positioned at an end of said table opposite to said delivery conveyor and in the path of travel of accumulated articles on said table, said plate being biased in a direction toward said delivery conveyor and having means associated therewith for moving said table away from said delivery conveyor upon displacement of said plate from said biasing position by the accumulated articles.

9. A loading machine as defined in claim 3 including a receiving case support table located below the outer end of said discharge chute and adapted to support a receiving case in a substantially horizontal position under the outer end of said chute, said support table permitting substantially horizontal movement of the receiving case during insertion of articles therein away from the end of said discharge chute, and buffering means associated with the table for stopping said movement of the receiving case at an outer limit of the table.

10. A loading machine as defined in claim 9 in which said buffering means includes a substantially vertical plate extending above the upper surface of said support table and disposed along a side of said support table opposite the end of said discharge chute, said plate being mounted for displacement in the direction of movement of the receiving case being biased against said movement and toward the end of said discharge chute.

References Cited

UNITED STATES PATENTS

| 2,053,435 | 9/1936 | Kimball et al. | 53—164 XR |
| 3,160,259 | 12/1964 | Dalton | 53—61 XR |
| 3,209,512 | 10/1965 | Ferguson et al. | 53—61 |
| 3,252,265 | 5/1966 | Small et al. | 53—160 XR |
| 3,332,200 | 7/1967 | Englander | 53—251 XR |

TRAVIS S. McGEHEE, *Primary Examiner.*

R. L. SPRUILL, *Assistant Examiner.*

U.S. Cl. X.R.

53—77, 159, 251; 198—33